Aug. 7, 1951            C. EXIBARD           2,563,163
IMPLEMENTS FOR THE ERADICATION OF CORNS ON THE
FEET AND METHOD FOR THEIR MANUFACTURE
Filed Aug. 11, 1948
*Fig.1*
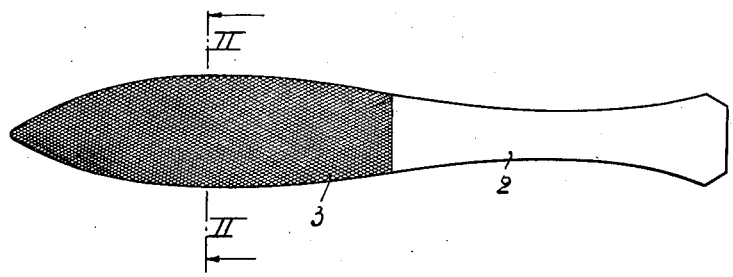
*Fig.2*          *Fig.3*
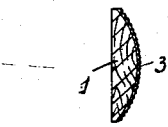     
*Fig. 4*
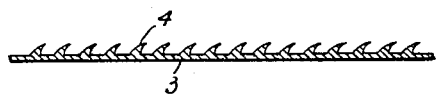
Inventor
Charlotte Exibard
ATTORNEY

UNITED STATES PATENT OFFICE 2,563,163

IMPLEMENTS FOR THE ERADICATION OF CORNS ON THE FEET AND METHOD FOR THEIR MANUFACTURE

Charlotte Exibard, Nice, France, assignor to Charles Ourièl, Nice, France

Application August 11, 1948, Serial No. 43,576
In France June 16, 1948

7 Claims. (Cl. 132—76.4)

This invention relates to an implement for the eradication of corns on the feet and other similar callosities. The invention also includes a method for manufacturing such implement.

It is well known that for certain pumicing work, more particularly in cabinet-making, the use of tools has been put forward in which the working surface is formed by fish-skin. However, the fish-skin employed is made up of conical-shaped corrugations, with the axis practically vertical, so that its method of use may be compared with that of sandpaper. In other words, the action of a fish-skin with its conical corrugations of the type used for cabinet-making, comes from an up and down rubbing motion on the material to be put together.

The object of the invention is a tool for the rubbing away of the corns of the feet and other similar calluses, that while showing a working surface formed by fish-skin, does not act by an up and down rubbing motion, which would be likely to set up inflammation, similar to what might be developed by a rasp or file rubbed over corns or other calluses that have to be removed.

The device according to the invention is characterised by the fact that it is made up of a body piece, roughly in the shape of a spatula, provided with a handle, with at least one of the surfaces of the body piece acting as a background for a sheet of fish-skin of which the roughnesses or corrugations are all headed in one and the same direction.

According to another feature of the invention, use is made preferably of the fish-skin coming from the species *Scymnus nicaensis*.

For the making of this particular instrument, and in accordance with the invention, after the fish-skin to be used is taken off the fish a cutting tool is employed to thin it down, then strips are stamped out from the portions provided with the right kind of roughnesses, in sizes corresponding to those of the surface that has to take them; these same strips are then soaked in a bath containing formaldehyde, and then they are stuck on after drying.

Other characteristics and advantages will make their appearance in the following specification given out with reference to the accompanying drawings that are mere examples and in which:

Fig. 1 is a plan view of the corn-eradicator.

Fig. 2 is a section along line II—II of Fig. 1.

Fig. 3 is a view similar to that of Fig. 2, showing a modified form of execution.

Fig. 4 is a view in section showing roughly, on a large scale, the shape of the tooth-like projections or scales on the fish-skin used.

According to the example of carrying out the invention as shown in Figs. 1 and 2, the tool that is made up of any suitable material, wood, metal, plastic material, etc. is provided with a body piece or member 1 in the shape of a spatula showing a cross section that is preferably convex and provided with a handle 2. On the convex surface of the body 1 is fastened a plate 3 formed by a piece of suitable fish-skin, of the right degree of hardness.

Use may be made of any fish-skin provided that the projections having the shape of a tooth or a curved hook or scales 4 (see Fig. 4) that appear on its outer surfaces are all bent back and headed in the same direction. Among the fishes with a skin that fulfills the requirements sought for that is, as pointed out previously, the eradication of corns on the feet and other similar callosities, may be specially mentioned a small dogfish classified as *Scymnus nicaensis* by the Naturalist Risso and that is known commonly as "gatte," one of the shark family called also *Gatta causiniera*, also as "liche" depending on whether this fish is caught in the Atlantic or in the Mediterranean.

The corn-eradicator, that is to say the body piece 1 and the handle 2 is made up in any suitable way, according to the type of material of which it is made and for the preparation of the plate 3 and its fastening on the body 1, the following procedure or a similar one may be carried out:

The skin is removed from the fish and a start is made by paring it down by a cutting tool, so that its thickness is substantially even throughout; when this is done, those portions of the thinned down skin are stamped out that exhibit a suitable type of roughnesses, that is to say where, all the spines or roughnesses are oriented or headed in the same direction, sloping in reference to the vertical, so as to form plates 3 corresponding in shape and size to those of the convex surface of the body 1.

The stamped out plates 3 are then allowed to soak in a formaldehyde bath. After drying, each plate 3 is stuck under pressure on the convex surface of a body 1; the edges of this plate that, after gluing, project over the sides of the body are removed finally by trimming.

The stamping is carried out, preferably, so that after gluing the tooth-like or hook-like projections or scales 4 of the fish-skin are headed towards the handle 2.

Through being soaked in a formaldehyde bath the plates 3 are made not only much harder which gives them a longer lease of life, but are rendered aseptic.

To make use of the tool as featured, all that has to be done is to move it, while pressing lightly, in contact with the corn or other callus to remove it. The plate 3 only does active work when the movement of the tool is from the handle towards the point and consequence is that the hard portions of the corn or other callus are scraped off in the form of extremely small particles, without giving rise to any inflammation.

The support or body member depicted in Fig. 3 is formed with two convex surfaces for the reception of two sections of Scymnus nicaensis skin, which sections may have similar or different abrading characteristics, depending upon the size and density of their tooth-like spines.

What I claim is:

1. A tool for removing chiropodic growths, comprising an oblong member having a convex side face; a handle rigidly connected to said member and having an axis arranged parallel to the longer side of said oblong member; an element of the skin of Scymnus nicaensis secured to said convex side face; and projections arranged on said element and each having the shape of a curved hook, said projections being directed toward said handle.

2. An implement for removing chiropodic growths comprising a support and a layer of Scymnus nicaensis skin secured to said support exposing a plurality of curved tooth-like spines oriented in substantially the same direction.

3. An implement for removing chiropodic growths comprising a support having a convex surface and a layer of Scymnus nicaensis skin secured to said surface exposing a plurality of curved tooth-like spines oriented in substantially the same direction.

4. An implement for removing chiropodic growths comprising a support having tool and handle portions and a layer of Scymnus nicaensis skin secured to said tool portion exposing a plurality of curved tooth-like spines oriented in substantially the same direction towards said handle portion.

5. An abrading implement comprising a section of formaldehyde hardened Scymnus nicaensis skin having a plurality of exposed curved tooth-like spines oriented in substantially the same direction.

6. An implement for removing chiropodic growths comprising a support and a layer of formaldehyde hardened Scymnus nicaensis skin secured to said support exposing a plurality of curved tooth-like spines oriented in substantially the same direction.

7. A process of making an abrading implement comprising removing skin from Scymnus nicaensis and treating said skin with formaldehyde.

CHARLOTTE EXIBARD.

REFERENCES CITED

The following references are of record in the file of this patent:

UNITED STATES PATENTS

| Number | Name | Date |
|---|---|---|
| 1,473,933 | Green | Nov. 13, 1923 |
| 2,035,521 | Benner et al. | Mar. 31, 1936 |
| 2,055,219 | Perrine | Sept. 22, 1936 |
| 2,347,856 | Wachter | May 2, 1944 |

OTHER REFERENCES

"American Leathers," published by American Leather Producers, Inc., 1 Park Avenue, New York city, copyright 1929, pages 113–115. (Copy in U. S. Patent Office, Div. 11.)